US010212366B2

(12) United States Patent
Dainty et al.

(10) Patent No.: US 10,212,366 B2
(45) Date of Patent: Feb. 19, 2019

(54) IRIS IMAGE ACQUISITION SYSTEM

(71) Applicant: FotoNation Limited, Galway (IE)

(72) Inventors: Christopher Dainty, Galway (IE);
Alexander Goncharov, Galway (IE);
Niamh Fitzgerald, Galway (IE)

(73) Assignee: FotoNation Limited, Galway (IE)

( * ) Notice: Subject to any disclaimer, the term of this patent is extended or adjusted under 35 U.S.C. 154(b) by 6 days.

(21) Appl. No.: 15/186,283

(22) Filed: Jun. 17, 2016

(65) Prior Publication Data

US 2017/0366761 A1 Dec. 21, 2017

(51) Int. Cl.
H04N 9/47 (2006.01)
H04N 7/18 (2006.01)
(Continued)

(52) U.S. Cl.
CPC ............. *H04N 5/33* (2013.01); *G02B 13/003* (2013.01); *G02B 13/008* (2013.01); *G02B 13/146* (2013.01); *G02B 13/18* (2013.01); *G02B 27/0075* (2013.01); *G06K 9/00597* (2013.01); *G06K 9/00604* (2013.01); *H04N 5/2253* (2013.01); *H04N 5/2254* (2013.01); *H04N 5/2256* (2013.01); *H04N 5/23219* (2013.01); *H04M 2250/52* (2013.01)

(58) Field of Classification Search
CPC ...... H04N 5/33; H04N 5/2254; H04N 5/2253; H04N 5/2256; G06K 9/00604; H04M 2250/52
USPC .......................................................... 348/78
See application file for complete search history.

(56) References Cited

U.S. PATENT DOCUMENTS 7,224,540 B2 * 5/2007 Olmstead ........... G02B 27/0075
235/462.41
8,345,936 B2 * 1/2013 Burge .................. G06K 9/2018
382/117
(Continued)

FOREIGN PATENT DOCUMENTS

WO 2016/020147 A1 2/2016
WO 2016/134942 A1 9/2016

OTHER PUBLICATIONS

A. K. Jain, A. Ross, and S. Prabhakar, "An introduction to biometric recognition," IEEE Transactions on Circuits and Systems for Video Technology, vol. 14, No. 1, Jan. 2004, pp. 4-20.

*Primary Examiner* — Mohammed S Rahaman
*Assistant Examiner* — Richard A Hansell, Jr.

(57) ABSTRACT

An iris image acquisition system comprises an image sensor comprising an array of pixels including pixels sensitive to NIR wavelengths; at least one NIR light source capable of selectively emitting light with different discrete NIR wavelengths; and a processor, operably connected to the image sensor and the at least one NIR light source, to acquire image information from the sensor under illumination at one of the different discrete NIR wavelengths. A lens assembly comprises a plurality of lens elements with a total track length no more than 4.7 mm, each lens element comprising a material with a refractive index inversely proportional to wavelength. The different discrete NIR wavelengths are matched with the refractive index of the material for the lens elements to balance axial image shift induced by a change in object distance with axial image shift due to change in illumination wavelength.

10 Claims, 3 Drawing Sheets

(51) Int. Cl.
  *H04N 5/33*   (2006.01)
  *G06K 9/00*   (2006.01)
  *H04N 5/225*  (2006.01)
  *G02B 27/00*  (2006.01)
  *G02B 13/00*  (2006.01)
  *G02B 13/14*  (2006.01)
  *G02B 13/18*  (2006.01)
  *H04N 5/232*  (2006.01)

(56) References Cited

U.S. PATENT DOCUMENTS

| | | | | |
|---|---|---|---|---|
| 9,465,988 | B1* | 10/2016 | Marason | G06K 9/00604 |
| 2006/0098097 | A1* | 5/2006 | Wach | G02B 27/0025 |
| | | | | 348/207.99 |
| 2009/0278922 | A1* | 11/2009 | Tinker | G06K 9/0061 |
| | | | | 348/78 |
| 2010/0172020 | A1* | 7/2010 | Price | G02B 21/0016 |
| | | | | 359/381 |
| 2010/0183199 | A1* | 7/2010 | Smith | G06K 9/00597 |
| | | | | 382/117 |
| 2011/0115938 | A1* | 5/2011 | Han | H04N 9/045 |
| | | | | 348/222.1 |
| 2014/0327753 | A1* | 11/2014 | Prabhakar | G06K 9/00604 |
| | | | | 348/78 |
| 2015/0227790 | A1* | 8/2015 | Smits | G06K 9/00604 |
| | | | | 348/78 |
| 2016/0300108 | A1* | 10/2016 | Willis | G06K 9/0061 |
| 2017/0038574 | A1* | 2/2017 | Zhuang | G02B 21/0068 |

* cited by examiner

IRIS IMAGE ACQUISITION SYSTEM

FIELD

The present invention relates to an iris image acquisition system.

BACKGROUND

A. K. Jain, A. Ross, and S. Prabhakar, "An introduction to biometric recognition," IEEE Trans. Circuits Syst. Video Technol., vol. 14, 2004 discloses that the iris of the eye is a near-ideal biometric. Typically an image of an iris is best acquired in a dedicated imaging system that uses infra-red (IR) illumination, typically near infra-red (NIR) in the range 700-900 nm.

WO2016/020147 (Ref: FN-397) discloses an optical system for an image acquisition device comprising a filter comprising a central aperture arranged to transmit both visible and selected near infra-red (NIR) wavelengths and a peripheral aperture arranged to block visible wavelengths and to transmit the NIR wavelengths. An image sensor comprises an array of pixels including pixels sensitive to visible wavelengths and corresponding pixels sensitive to the NIR wavelengths. A lens assembly is axially located between the filter and the image sensor and comprises a plurality of lens elements. The lens elements are arranged to simultaneously focus NIR light received from a given object through central and peripheral apertures of the filter and visible light received from the object through the central aperture onto the sensor surface.

The optical system of WO2016/020147 is shallow enough to be accommodated in a smartphone housing and to enable a user to capture both visible wavelength images for general purpose photography as well as IR images of a user's iris for biometric recognition. However, it is limited in the distance at which it can acquire an in-focus IR image which can be used for biometric recognition.

PCT/EP2016/052395 (Ref: FN-452) discloses an optical system for an image acquisition device comprising an image sensor comprising an array of pixels including pixels sensitive to IR wavelengths for acquiring an image. A lens assembly includes a collecting lens surface with an optical axis, the lens assembly being arranged to focus IR light received from a given object distance on the sensor surface. The lens assembly includes at least a first reflective surface for reflecting collected light along an axis transverse to the optical axis so that a length of the optical system along the optical axis is reduced by comparison to a focal length of the lens assembly.

In PCT/EP2016/052395 in particular, the optical system comprises a dedicated lens for acquiring IR images which is shallow enough to be accommodated within a smartphone housing and which allows a user to authenticate themselves to the smartphone.

It will be appreciated that for any optical system which is to be employed within a smartphone for acquiring IR images of a user's iris, it is desirable to be able to acquire in-focus images of a user's iris across as large a range of distances as possible to allow for maximum variation in the distance at which a user holds a smartphone from their face, but without needing to increase the depth of the smartphone housing to accommodate the optical system.

SUMMARY

According to the present invention, there is provided an iris image acquisition system according to claim 1.

The system includes an iris imaging lens assembly with a dual wavelength illumination system which extends the depth of field of the lens assembly without increasing the depth of the lens assembly.

The system comprises a fixed focus lens assembly, without need for mechanical refocusing, whose depth of field is extended for imaging a user's iris at different distances through a multi-wavelength NIR flash system. The focusing is achieved optically by optimising an axial chromatic aberration of the lens assembly to cover an appropriate distance range, matched with spectral characteristics of the illumination sources.

BRIEF DESCRIPTION OF THE DRAWINGS

Embodiments of the invention will now be described, by way of example, with reference to the accompanying drawings, in which.

DESCRIPTION OF THE EMBODIMENTS

Figure 1:
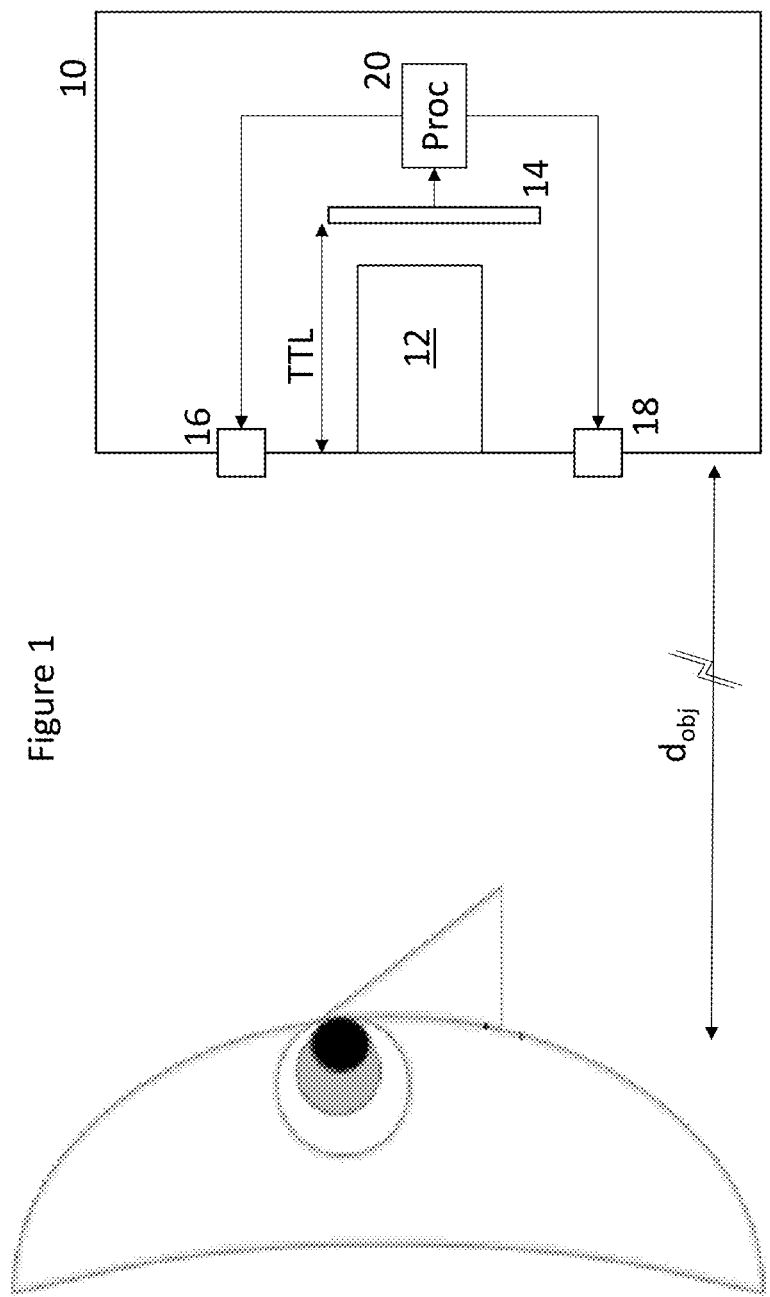
FIG. 1 shows schematically an iris image acquisition system including multiple illumination sources and an optical system according to an embodiment of the present invention.

Referring now to FIG. 1, there is shown schematically an iris image acquisition system 10 according to an embodiment of the present invention. The system 10 comprises a fixed focus lens assembly 12 disposed in front of an image sensor 14. In the embodiment, the system comprises two NIR illumination sources 16, 18, however it will be appreciated that in variations of the embodiment more than two sources can be employed, or alternatively a single tunable light source could be used. The illumination sources provide at least two narrow spectral bands (of up to around one hundred nanometers) and these bands can be partially overlapping, for example, 750-850 nm and 800-900 nm, or non-overlapping, for example, 820-860 nm and 920-960 nm. The illumination sources 16, 18 are shown schematically in FIG. 1 as single light sources, however, it will be appreciated that there could be multiples of each, for example a ring of alternating sources surrounding the lens assembly 12. In any case, the operation of each of the sensor 14 and the sources 16, 18 is controlled by a processor 20. The processor 20 can be a dedicated processor or processing module especially arranged to perform biometric recognition of a user of a device including the system 10; or the processor 20 can be a general purpose processor within say a camera and which is arranged to process images acquired from the sensor 14 for the purposes of biometric recognition as well as to run other camera applications.

The sensor 14 includes pixels approximately 1.1 μm in size or smaller as guided by Nyquist sampling criteria and which are responsive to NIR wavelengths. Where the pixels are responsive to wavelengths across the IR spectrum including the illumination wavelengths of the sources 16, 18, the processor operates by acquiring a first image of a scene illuminated by the first source 16 and separately a second image of a scene illuminated by the second source 18. If the distance to the subject is known, it may be possible to only acquire image(s) illuminated by one or other source as appropriate.

The lens components of the assembly 12 are made of glass or plastic materials, which have one property in common, the refractive index decreases with increase in wavelength at least in the IR spectrum. Thus, the refraction of the lens system is stronger at shorter wavelength and so images at shorter wavelengths tend to be formed closer to the back surface of the lens assembly. Similarly, images at longer wavelengths tend to be formed further away from the lens assembly 12. In a broadband illuminated system, this would give rise to longitudinal chromatic aberration (so called axial colour). However, if respective images are obtained by illuminating at a narrow wavelength band, each image will not be noticeably degraded by axial colour, rather they will simply be focussed at different object distances—so having the effect of extending the focus depth of the fixed focus lens assembly through employing multiple illumination sources.

Utilising this effect is known, for example, U.S. Pat. No. 7,224,540 discloses a system for reading bar codes at various distances of around 125-200 mm from a reader using infra-red and yellow light sources. However, the optics provided in U.S. Pat. No. 7,224,540 are not suitable for incorporation in a smartphone housing and for acquiring iris images at distances in excess of 200 mm at which users typically feel comfortable holding a smartphone for imaging their iris for the purposes of biometric recognition.

In embodiments of the present invention, the wavelengths of illumination sources 16,18 are matched with the refractive index of the material used for the lens assembly 12 to balance the axial image shift induced by change in iris-lens distance with the image shift due to change in illumination wavelength, and keep iris images from respective object distances in focus.

As is well known, oxygen absorbs at 0.76 μm in a narrow band, while water vapours absorb near 0.94 μm, which can be useful when suppressing sunlight during iris imaging with dedicated light sources, if one source is operating at $\lambda=0.76$ μm, while the other is at $\lambda=0.94$ μm. However, as it can be difficult to provide an image sensor 14 with pixels which are suitably sensitive to wavelengths as long as $\lambda=0.94$ μm, a compromise is to use $\lambda=0.87$ μm as a second wavelength, and it is this wavelength which is employed in the examples below.

In view of this, one embodiment of the present invention employs the following LEDs as the illumination sources 16,18 for iris illumination: LED780E with 30 nm FWHM (Full width at half maximum) and LED870E with 40 nm FWHM or LED940E with 50 nm FWHM.

Figure 2:
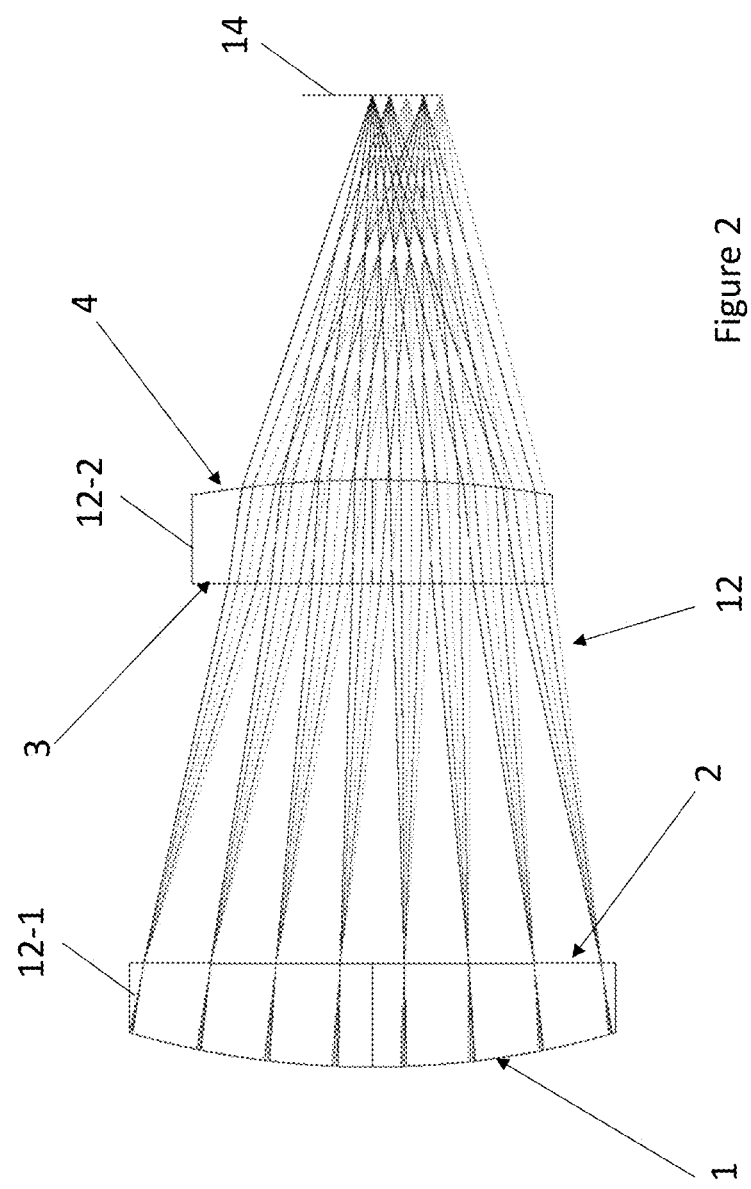
FIG. 2 shows a two-lens F/2 optical system for iris imaging with extended depth of field according to an embodiment of the present invention.

Referring now to FIG. 2, there is shown an exemplar lens assembly 12. The lens assembly comprises a two-lens system comprising a front lens 12-1 with an aperture stop (not shown) at its rear surface (2) with a diameter of D=1.8 mm (an entrance pupil radius of 0.9 mm) and a rear lens 12-2 disposed between the front lens 12-1 and the sensor 14. The lens assembly has a focal length f=3.574 mm (at $\lambda=870$ nm), i.e. f-number≅2 (F/2).

The front lens 12-1 and back lens 12-2 are plano-convex, with the convex surfaces 1,4 having spherical shape, and the plano surfaces 2,3 being even aspheres. Aspheric surfaces are required to correct for field aberrations across 40 mm full field in object space, which corresponds to 8.6 deg at 200 mm object distance. In addition to correcting the field aberration, aspheric surfaces allow for adjusting spherical aberration to help to extend slightly the depth of field of the two-lens system.

Optical system data and characteristics for the lens assembly 12 are given in Tables 1-3 below:

TABLE 1

Optical System data.

| Surface | Type | Radius | Thickness | Glass | Diameter (mm) | Conic | Comment |
|---|---|---|---|---|---|---|---|
| OBJ | Standard | Infinity | 350 | | 40 | 0 | object plane |
| 1 | Standard | 2.584 | 0.5 | N-BK7 | 1.82 | 0 | sphere |
| 2 | Evenasph | Infinity | 1.803 | | 1.72 | −1 | asphere 1* |
| 3 | Evenasph | Infinity | 0.5 | N-BK7 | 1.31 | −1 | asphere 2* |
| 4 | Evenasph | — | 1.897 | | 1.25 | 0 | sphere |
| | | 3.1747 | | | | | |
| IMA | Standard | Infinity | | | 0.43 | 0 | image plane |

*even asphere is defined by the sag equation $z = y^2/2r + a1*y^4 + a2*y^6 + a3*y^8 + a4y^{10}$, see Table 2.

TABLE 2

Aspheric coefficients for surfaces 2 and 3.

| | Asphere 1 | Asphere 2 |
|---|---|---|
| Coefficient a1 on $y^4$: | 0.024213695 | −0.014112627 |
| Coefficient a2 on $y^6$: | −0.048858712 | 0.030676076 |
| Coefficient a3 on $y^8$: | 0.067685793 | −0.16178231 |
| Coefficient a4 on $y^{10}$: | −0.034903531 | 0.17971342 |

TABLE 3

Optical characteristics of the two-lens system at the two wavelengths.

| Illumination Wavelength | 780 nm | 870 nm |
|---|---|---|
| Object distance | 200 mm | 350 mm |
| Effective Focal Length | 3.555 mm | 3.574 mm |
| Working F/# | 2.003 | 2.005 |
| Paraxial Image Height | 0.2695 mm | 0.2055 mm |
| Paraxial Magnification | −0.018 | −0.0103 |
| Back Focal Length | 1.82 mm | 1.836 mm |
| Airy disk radius | 1.87 μm | 2.09 μm |

The total track length (TTL) of the lens assembly, the distance on the optical axis between the object-side surface 1 of the first lens element 12-1 and the image sensor 14, is 4.7 mm, and this is shallow enough to be accommodated within the housing of slim smartphones.

According to whether a face is illuminated using LED780E ($\lambda=780\pm15$ mm) or LED870E ($\lambda=870\pm20$ mm), an iris can be imaged with the above lens assembly at a distance ranging from 200 mm to 350 mm. The full field of view in object space is 40 mm, which is sufficient to image one eye at a time.

An iris placed at the nearest distances 200 mm . . . 270 mm from the lens assembly is focused on a sensor 14 illuminated by the shorter wavelength $\lambda$=780 nm source, with noticeably higher angular resolution, while at far distances in the range of 270 . . . 350 mm, the iris is illuminated by the longer wavelength $\lambda$=870 nm source. Imaging at longer distances and longer wavelengths makes obtaining near diffraction image quality more challenging. Thus angular resolution at object distance range of 280 . . . 350 mm is more challenging, but still sufficient for iris imaging for the purposes of biometric recognition. So, in the example, while it would be possible to use the longer wavelength $\lambda$=870 nm source for imaging objects at distances from 250-270 mm, however, where there is overlap in focus ranges, it is typically preferable to employ images illuminated by the shorter wavelength source; or at least, this is typically the image which will be chosen.

In the embodiment, the material chosen for both lenses is BK7 glass with higher dimension stability by comparison with plastic materials. These lenses can be manufactured using thin wafer glass technology (by pressing the metal master against soften glass).

Figure 3B:
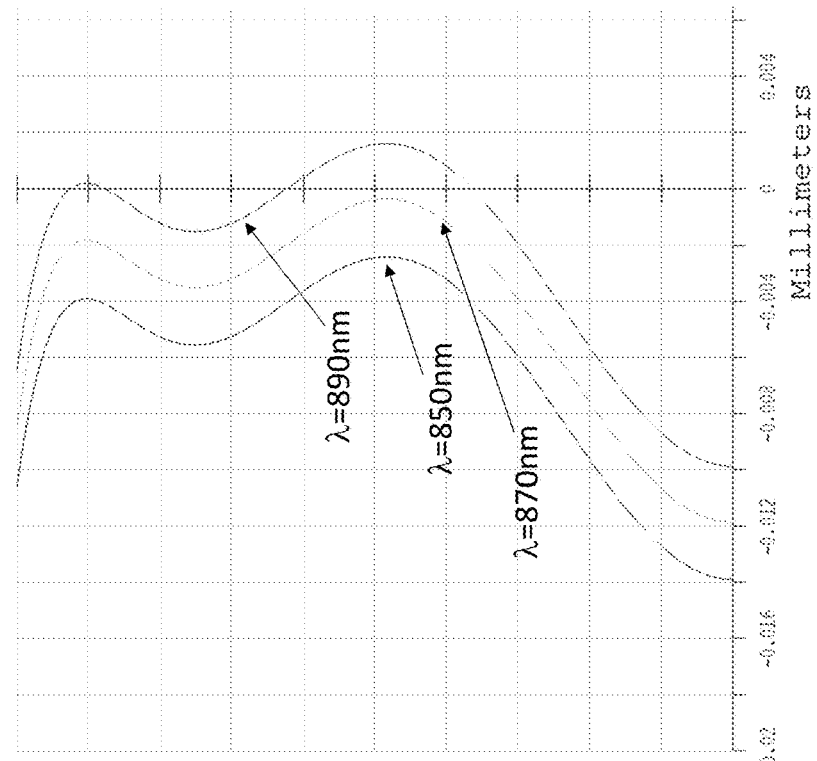
FIGS. 3(a) and (b) show longitudinal spherical aberration of the two-lens system of FIG. 2 at $d_{obj}$=200 mm and 350 mm respectively.
Figure 3A:
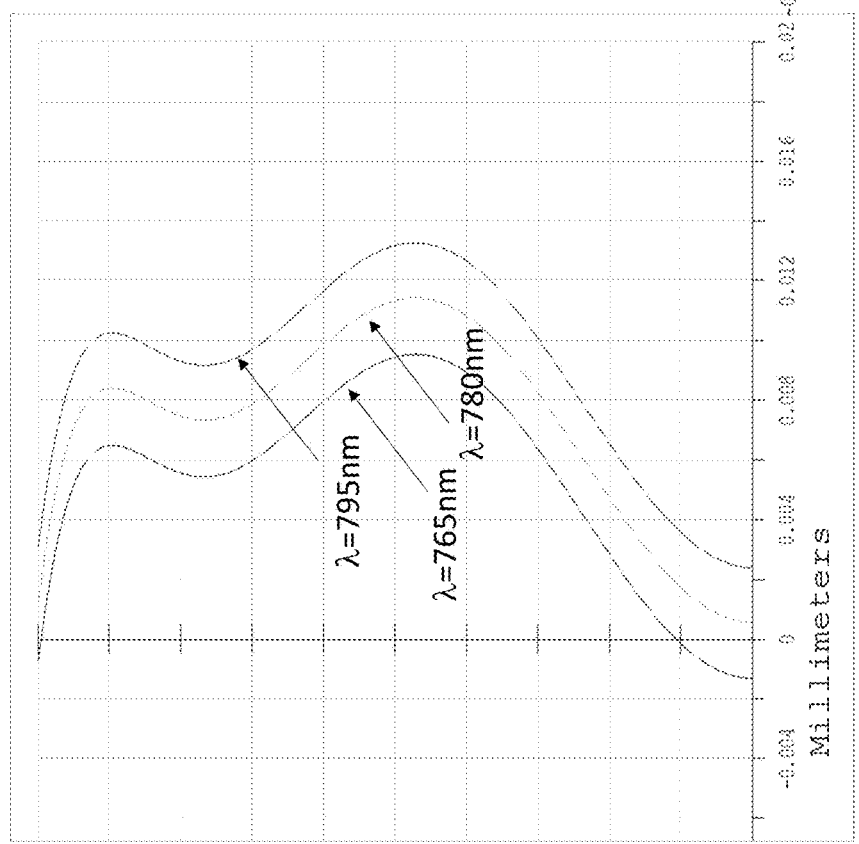

FIG. 3 shows Longitudinal Spherical Aberration (LSA) plots at near and far object distances $d_{obj}$ for the lens assembly of FIG. 2 as specified above. Note from FIG. 3(*a*), that at $d_{obj}$=200 mm, the paraxial focus for an illumination wavelength of $\lambda$=780 nm closely coincides with the sensor plane, whereas in FIG. 3(*b*) for an illumination wavelength of $\lambda$=870 nm and $d_{obj}$=350 mm, the paraxial focus is 12 microns in front of the sensor (it would be coincident with the sensor only at $d_{obj}$=234 mm). In spite of the 12 µm focal shift, the image quality is still diffraction limited, even though the depth of focus is only $\Delta$=2$\lambda$(f-number)$^2$=2×0.87×4=7.0 µm (using the standard depth of focus formula 2$\lambda$(f-number)$^2$ according to the Rayleigh criterion for defocus or the Strehl criterion for defocus). This is possible due to highly overcorrected spherical aberration at the intermediate and marginal annular zones of the lens aperture.

The depth of focus formula is applied here only loosely, as spherical aberration will affect the best focus position and depth of focus. The best focus is situated about 8 µm after the paraxial focus. In object space, the best focus occurs at the distance of 240 mm and 300 mm, for $\lambda$=780 nm and $\lambda$=870 nm, respectively. Thus switching from $\lambda$=780 nm to $\lambda$=870 nm, axial chromatic aberration alone provides the range of focus from 240 mm to 300 mm with the sensor placed at the best focus position.

From FIG. 3 one can see that the shape of LSA curves does not change much across the range of object distances 200 mm to 350 mm. The overcorrected spherical aberration plays an important role in extending slightly the depth of field. In this system, the depth of field at $\lambda$=780 nm at best focus is given approximately by $\Delta(d_{obj}/f)^2$=0.007(240/3.57)$^2$=32 mm, providing the focus distance range from about 200 mm till about 270 mm, whereas at the longer wavelength $\lambda$=870 nm the depth of field is about $\Delta(d_{obj}/f)^2$=0.007(300/3.57)$^2$=50 mm giving the focus distance range from 250 mm till 350 mm. Note the overlap between these two cases that ensures continuous range of operation.

Using this lens assembly, field curvature at object distances of between 200 mm and 350 mm is not significant and image distortion is less than 0.01%. While image quality gradually degrades at larger object distances, acquired images are sufficient for iris imaging for the purposes of biometric recognition.

The lens assembly 12 has a number of advantages:
1) Fast f/2.0 lens without central obscuration and relatively short TTL=4.7 mm.
2) Diffraction-limited image quality within 20 mm field in object space, MTF>0.5 at 2 lines per mm.
3) The two-lens design can be made by glass moulding many units on a single thin wafer, thus cost effective for mass production.
4) Residual axial chromatic aberration, even at 90 nm iris illumination wavelength difference between sources 16, 18, makes it possible to cover 200 . . . 350 mm object distance range without the need for mechanical refocusing.
5) Nyquist sampling is possible with two ~1.1 µm pixels per 1.87-2.09 µm Airy disk radius.

In variations of the above embodiment, it could be possible to obtain usable iris images from longer object distances for example, by increasing the aperture diameter.

The above described embodiment maintains field aberrations under control across a useable field of view of about 40 mm diameter in object space. As such, imaging of both eyes is not possible. In order to do so, an increased complexity lens assembly comprising at least 4 lenses would be required.

In variants of the above described embodiments first polarisers (not shown) are mounted in front of each NIR illumination source 16, 18 and a second polarizer (not shown) is mounted in front of the lens assembly. The polarizers can be either: linear, each having respective polarization axes at 90 degrees to one another; or circular, each having opposite polarization senses to mitigate problems with glare from glasses occluding an image of an iris.

The invention claimed is:

1. An iris image acquisition system comprising: an image sensor comprising an array of pixels including pixels sensitive to near infra-red (NIR) wavelengths; at least one NIR light source capable of selectively emitting light with different discrete NIR wavelengths; a processor, operably connected to said image sensor and said at least one NIR light source, to acquire image information from said image sensor under illumination at one of said different discrete NIR wavelengths; a lens assembly comprising a plurality of lens elements with a total track length no more than 4.7 mm, each lens element comprising a material with a refractive index inversely proportional to wavelength, said different discrete NIR wavelengths being matched with the refractive index of the material for the lens elements to balance an axial image shift induced by a change in object distance with the axial image shift due to change in illumination wavelength, and to focus NIR light at a first NIR wavelength reflected from an iris imaged at a first object distance between about 200 mm and 270 mm on said image sensor and to focus NIR light at a second NIR wavelength, longer than said first NIR wavelength, reflected from the iris imaged at a second object distance, between about 270 mm to 350 mm, on said image sensor.

2. An iris image acquisition system according to claim 1 wherein said lens assembly comprises a front lens and a rear lens axially disposed between said front lens and said image sensor, a rear surface of said front lens and a front surface of said rear lens comprising even aspheric surfaces to correct for field aberrations across an approximately 40 mm field in object space.

3. An iris image acquisition system according to claim 1 wherein said lens assembly has an aperture stop of approximately 1.8 mm and a focal length at NIR wavelengths to provide an optical system for said NIR wavelengths of approximately f/2.

4. An iris image acquisition system according to claim 1 wherein said focal length of said lens assembly at NIR wavelengths is approximately 3.57 mm.

5. An iris image acquisition system according to claim 1 wherein said at least one NIR light source comprises at least one light emitting diode (LED).

6. An iris image acquisition system according to claim 1 wherein said first wavelength is approximately 780 nm and said longer second wavelength is either: 870 nm or 940 nm.

7. An iris image acquisition system according to claim 1 wherein said material of each lens element is glass.

8. An iris image acquisition system according to claim 1 comprising either a single tunable NIR light source; or a plurality of discrete NIR light sources.

9. An iris image acquisition system according to claim 1 comprising two light sources, each emitting light having a FWHM (full width at half maximum) of no more than 50 nm.

10. A smartphone including the iris image acquisition system according to claim 1 and further comprising a processor arranged to analyse images acquired from said image sensor to perform biometric recognition of a user of said smartphone.

* * * * *